(12) United States Patent
Lee

(10) Patent No.: US 6,208,427 B1
(45) Date of Patent: Mar. 27, 2001

(54) PERSONAL DIGITAL ASSISTANT (PDA) PRINTER APPARATUS AND PRINTING METHOD

(75) Inventor: Je-hyoung Lee, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 08/972,261

(22) Filed: Nov. 18, 1997

(30) Foreign Application Priority Data

Dec. 27, 1996 (KR) .................................. 96-73979

(51) Int. Cl.$^7$ ..................................... G06F 15/00
(52) U.S. Cl. .................. 358/1.15; 358/1.13; 358/434; 358/468
(58) Field of Search .................. 395/114, 112; 358/402, 405, 407, 442, 404, 434, 440, 468, 1.13, 1.14, 1.15

(56) References Cited

U.S. PATENT DOCUMENTS

| 5,410,416 | * | 4/1995 | Amberg et al. ...................... 358/405 |
| 5,513,254 | * | 4/1996 | Markowitz ............................ 379/100 |
| 5,822,123 | * | 10/1998 | Davis et al. .......................... 348/564 |
| 5,877,746 | * | 3/1999 | Parks et al. .......................... 345/156 |
| 5,892,587 | * | 4/1999 | Okada et al. ......................... 358/402 |
| 5,917,615 | * | 6/1999 | Reifman et al. ...................... 358/468 |

FOREIGN PATENT DOCUMENTS

| 0 426 412 | 5/1991 | (EP) ................................ H04N/1/32 |
| 58-87564 | 5/1983 | (JP) ................................ G03G/15/04 |
| 5-92858 | 12/1993 | (JP) ................................ B65H/23/34 |
| 8-172496 | 2/1996 | (JP) ................................ H04N/1/00 |

OTHER PUBLICATIONS

Laser Class 7000/7500, Instruction Book, p. 198, 1993.*
Macformat, Sep. 1, 1993, Future Publishing Ltd., UK XP002061491, p. 21.

* cited by examiner

Primary Examiner—Joseph Mancuso
Assistant Examiner—Douglas Tran
(74) Attorney, Agent, or Firm—Sughrue, Mion, Zinn, Macpeak & Seas, PLLC

(57) ABSTRACT

A Personal Digital Assistant (PDA) printer and printing method. The printer includes a user interface that allows a user, through a display, to select a fax note which is stored in memory, insert/remove fax headers, set margins, and input fax transmission instructions. The printer includes a memory that stores fax notes fax header insertion/removal instructions, and fax note margin instructions. The printer also includes a processor that initializes a fax modem and sets an environment for fax transmission to a receiving fax machine upon input of the fax transmission instructions. The processor also inserts and removes a fax header based on information stored in the header information flag when fax transmission is ready, reads fax header data and the fax note and margin information and generates bit map image data. The processor also converts the bit map image data into a data format for fax transmission, transmits the data converted by the data format converter, and terminates fax connection when data is completely transmitted.

2 Claims, 4 Drawing Sheets

PERSONAL DIGITAL ASSISTANT (PDA) PRINTER APPARATUS AND PRINTING METHOD

BACKGROUND OF THE INVENTION

1. Field of the Invention

The present invention relates to a personal digital assistant (PDA), and more particularly, to a PDA printer and a printing method containing a display capable of displaying characters and graphic data, a fax modem capable of transmitting and receiving fax data, and a memory capable of storing data.

2. Description of the Related Art

As society becomes more complex and diversified, user demands for data communication services also become diversified. These demands have been satisfied through developments in data communication technology. In this context, the PDA has emerged. The PDA, serving as a portable computer, fax, and electronic pocket book, is so named because it provides personal and multimedia services which incorporate recent data communication technology. The PDA enables a user to easily access a small and portable terminal using a pen or voice, instead of a conventional keyboard, and provides a graphic user interface (GUI) environment. In addition, the PDA serves as a notebook computer which allows external communication.

Data communication, including Internet connection, PSTN connection to an information media like UNITEL, and fax communication, has recently become the most significant function of the PDA.

Generally, PDA fax transmission is performed by means of a simple note made on a memo pad included in the PDA. In a conventional PDA, a note is printed by direct connection to a printer or by using fax transmission. However, the former method requires a driver program for driving the printer, which results in development constraints upon the driver program and portable printer. Therefore, the latter method is used.

However, because the purpose of conventional fax transmission is simply to transmit a note by fax, it is inconvenient to transmit a formal document and utilize fax transmission for printing. Header output such as reception time, fax number, and page number on the upper portion of a fax note creates inconvenience to a user.

SUMMARY OF THE INVENTION

The objective of the present invention is to provide a PDA printer and a printing method in which a fax transmission function is improved by outputting a note without a header, as if the note were printed by a printer.

To meet this objective, a PDA printer has been developed which contains a display capable of displaying characters and graphic data, a fax modem capable of transmitting and receiving fax data, and a memory capable of storing data, that comprises:

- a user interface through the display that allows a user to select a fax note which is stored in the memory, insert/remove a fax header, set margins, and input fax transmission instructions;
- a fax note storage for storing the fax note selected by the user;
- a header information flag for storing fax header insertion and removal instructions provided by the user;
- a margin information storage for storing fax note margin instructions provided by the user;
- a fax connection setter for initializing the fax modem for fax transmission and setting an environment for fax transmission to a receiving fax machine upon input of the fax transmission instructions;
- a fax header information controller for inserting or removing a fax header based on information stored in the header information flag when fax transmission is ready;
- a bit map image generator for reading fax header data inserted by the fax header information controller, and the fax note and margin information from the fax note storage and the margin information storage, and generating bit map image data;
- a data format converter for converting the bit map image data into a data format for fax transmission;
- a data transmitter for transmitting the data converted by the data format converter; and
- a fax connection releaser for terminating fax connection when data is completely transmitted by the data transmitter.

A printing method has also been developed for a PDA which has a display capable of displaying characters and graphic data, a fax modem capable of transmitting and receiving fax data, and a memory capable of storing data. The printing method comprises the steps of:

(a) providing a user interface through the display that allows a user to select a fax note stored in the memory, insert/remove a fax header, and set upper, lower, right, and left margins;

(b) selecting one of an insertion and removal menu item provided by the user interface;

(c) setting upper, lower, right, and left margins for a fax note through the user interface;

(d) selecting a fax note to be transmitted through the user interface;

(e) initializing the modem for fax transmission, setting an environment for fax connection to a receiving fax and preparing for transmission;

(f) reading the selected header insertion/removal instructions, inserting a fax header if fax header insertion is indicated, converting the inserted fax header into bit map image data, converting the bit map image data into fax transmission data, and if fax header removal is indicated, the procedure goes to the next step without data transmission;

(g) converting the note and the margin instructions into bit map image data, converting the bit map data image into fax transmission data, and transmitting the fax transmission data; and (h) terminating fax connection if the fax note is completely transmitted.

BRIEF DESCRIPTION OF THE DRAWING

The above objectives and advantages of the present invention will become more apparent by describing in detail a preferred embodiment thereof with reference to the attached drawing(s) in which.

DETAILED DESCRIPTION OF THE PREFERRED EMBODIMENT

Figure 1:
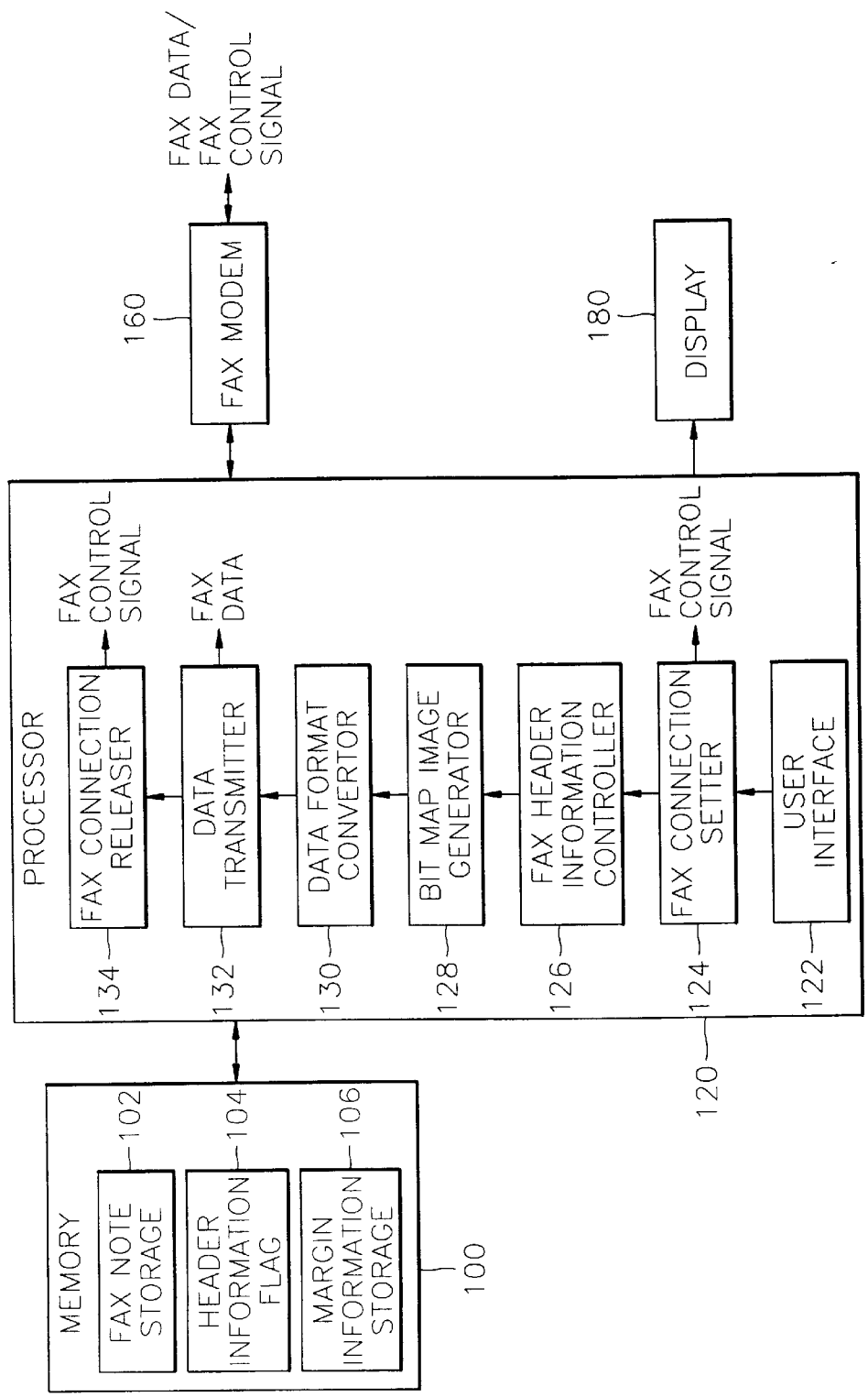
FIG. 1 is a block diagram of a PDA printer according to the present invention.

Referring to FIG. 1, a PDA printer according to the present invention includes: a display 180 that displays characters and graphic data; a fax modem 160 that transmits and receives fax data; a memory 100 that stores data, and a processor 120 that processes data stored in the memory 100. Memory 100 includes: a fax note storage 102; a header information flag 104; and a margin information storage 106. Processor 120 includes: a user interface 122; a fax connection setter 124; a fax header information controller 126; a bit map image generator 128; a data format converter 130; a data transmitter 132; and a fax connection releaser 134.

User interface 122 provides a user interface through display 180, for selecting a fax note which is stored in memory 100 and is to be transmitted by fax, inserting/removing a fax header, setting upper, lower, right, and left margins of the fax note, and receiving fax transmission instructions. Interface 122 enables a user to edit a note or output a note using a facsimile telegraph. For example, when a lease contract is to be output, a corresponding note is selected and interface 122 allows the user to determine whether to insert or remove a header before fax transmission. In addition, the user can set upper, lower, right, and left margins. The information selected by the user is stored in a flag register so that it can be referred to in a fax transmission module. After the user selects a note, the fax transmission instruction is issued.

Fax note storage 102 stores a fax note which is selected for transmission by the user.

Header information flag 104 stores header insertion or removal information provided by the user through user interface 122.

Margin information storage 106 stores information regarding the upper, lower, right, and left margins for the fax note selected by the user through user interface 122.

Fax connection setter 124 performs a predetermined initialization for receiving a fax upon input of the fax transmission instruction from user interface 122, sets the PDA to a fax transmission stand-by state for detecting a ring signal of the other part which receives a fax, and prepares for transmission by setting an environment for fax transmission.

Fax header information controller 126 reads information stored in header information flag 104 and inserts or removes the fax header according to the flag information, when fax connection setter 124 is ready for fax transmission.

Bit map image generator 128 reads fax header data inserted by fax header information controller 126, reads fax note and margin information from fax information storage 102 and margin information storage 106, and generates bit map image data.

Data format converter 130 converts the bit map image data generated by bit map image data generator 128 into Modified Huffman (MH) codes which are a data format for fax transmission.

Data transmitter 132 transmits the data converted in data format converter 130.

Fax connection releaser 134 terminates the fax connection when the data is completely transmitted by data transmitter 132, informs the receiving fax machine of the end of transmission, turns off the modem and returns an allocated memory when a confirm message is received from the other fax machine, and notifies the user via interface 122 that fax transmission has been completed.

Figure 2:
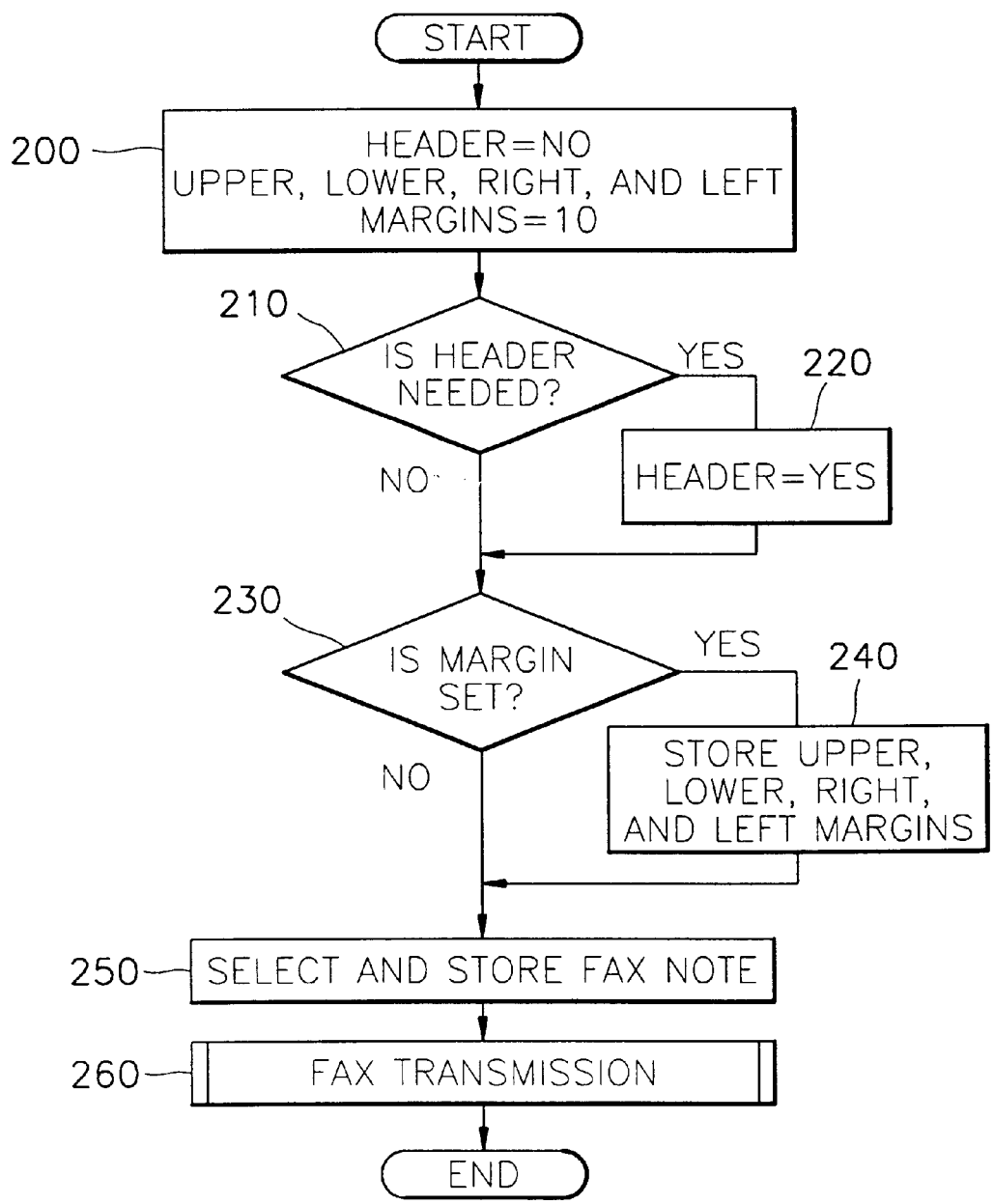
FIG. 2 is a flowchart outlining the operation of the PDA printer according to the present invention.

FIG. 2 is a flowchart outlining the operation of the PDA printer according to the present invention. Header information flag 104 is set to 'NO' to indicate that no header information is needed and the upper, lower, right, and left margins of the fax note are set to 10, in step 200. Then, the fax header insertion or removal menu item provided through user interface 122 is selected in step 210. If 'HEADER NEEDED', that is, 'HEADER=YES', is selected, the selected information is stored in header information flag 104, in step 220. If 'HEADER NOT NEEDED' is selected, the upper, lower, right, and left margin items are selected through user interface 122 in step 230, and the selected margin information is stored in margin information storage 106, in step 240. A fax note to be transmitted is selected through user interface 122 and the selected fax note is stored in fax note storage 102, in step 250. Then, fax transmission is performed and the procedure ends, in step 260.

Figure 3:
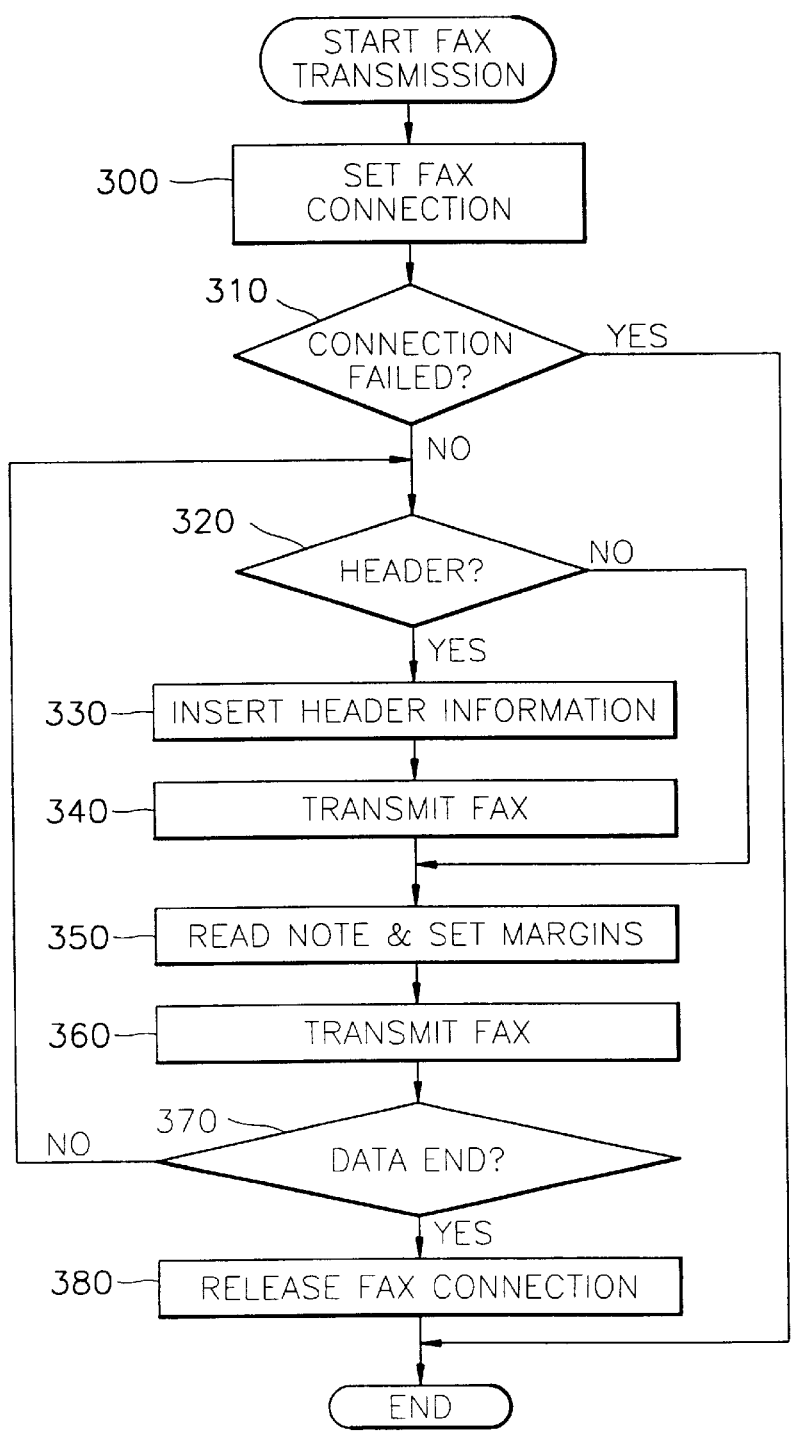
FIG. 3 is a detailed flowchart outlining the fax transmission step of FIG. 2.

FIG. 3 is a detailed flowchart outlining the operation of fax transmission step 260. First, fax connection setter 122 initializes the fax modem to transmit a fax, sets a transmission environment for fax connection to a receiving side, and prepares for transmission, in step 300. The fax initialization includes executing a modem initialization instruction and initializing buffers and flags which are used.

If a fax connection to the receiving side is successfully completed in step 300, the header insertion/removal information stored in header information flag 104 is read to determine whether a header is needed or not, in step 320. In step 330, a fax header is inserted if the header information flag 104 indicates that header information is required. In step 340, fax transmission is performed. If the header information flag 104 indicates that fax header insertion is not required, the procedure goes to the next step.

After fax header insertion step 330, the fax note to be transmitted and the margin information are read from fax note storage 102 and margin information storage 106, respectively, in step 350, and transmitted in step 360. Steps 320 to 360 are repeated until there is no data to be transmitted, in step 370. If there is no data to be transmitted, the fax connection is released in step 380.

Figure 4:
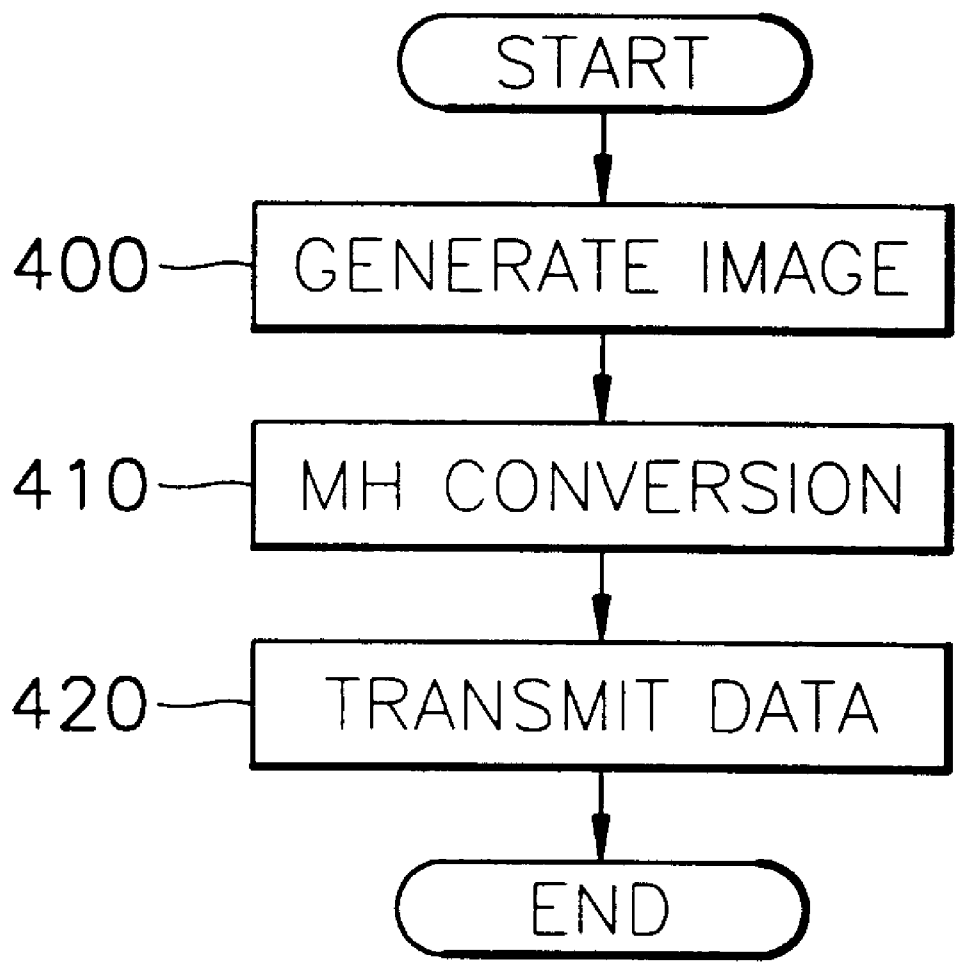
FIG. 4 is a detailed flowchart outlining the fax transmission step of FIG. 3.

FIG. 4 is a detailed flowchart of steps 340 and 360. In step 400, the inserted fax header and the stored note and margin information are converted into bit map image data in bit map image data generator 128. In step 410, the generated bit map image data is converted into fax transmission data in data format converter 132. In step 420, the converted data is transmitted via data transmitter 132.

According to the present invention, when notes such as a customer specification, a temporary contract, and a customer consultation statement are to be output by fax, the notes can be printed by fax as if they were printed by a general printer, by removing header information in the upper portions of the notes.

While only certain embodiments of the invention have been specifically described herein, it is apparent that numerous modifications may be made without departing from the spirit and scope of the invention.

What is claimed is:

1. A printer for a Personal Digital Assistant (PDA) containing a display capable of displaying characters and graphic data, a fax modem capable of transmitting and receiving fax data, and a memory capable of storing data, said printer comprising:

a user interface through said display that allows a user to select a fax note which is stored in said memory, insert/remove a selected fax note header, set margins, and provide fax transmission instructions;

a fax note storage for storing said fax note selected by the user;

a header information flag for storing the fax header insertion/removal information selected by user;

a margin information storage for storing the fax note margin information selected by said user;

a fax connection setter for initializing the fax modem for fax transmission and setting an environment for fax transmission to a receiving fax machine upon input of said fax transmission instructions;

a fax header information controller for inserting/removing a fax header based on information stored in said header information flag when fax transmission is ready;

a bit map image generator for reading fax header data inserted by said fax header information controller, and said fax note and margin information from said fax note storage and said margin information storage, and generating bit map image data;

a data format converter for converting said bit map image data into a data format for fax transmission;

a data transmitter for transmitting said data converted by said data format converter; and a fax connection releaser for terminating fax connection when data is completely transmitted by said data transmitter.

2. A printing method for a PDA containing a display capable of displaying characters and graphic data, a fax modem capable of transmitting and receiving fax data, and a memory capable of storing data, comprising the steps of:

(a) providing a user interface through the display that allows a user to select a fax note stored in said memory, insert/remove a selected fax note header, and set upper, lower, right, and left margins;

(b) selecting insertion/removal instructions from a menu provided by said user interface;

(c) setting upper, lower, right, and left margins for a fax note through said user interface;

(d) selecting a fax note to be transmitted through said user interface;

(e) initializing said modem for fax transmission, setting an environment for fax connection to a receiving fax and preparing for transmission;

(f) reading said selected header insertion/removal instructions, inserting a fax header if fax header insertion is indicated, converting said inserted fax header into bit map image data, converting said bit map image data into fax transmission data, and if fax header removal is indicated, the procedure goes to the next step without data transmission;

(g) converting said selected fax note and said margin instructions into bit map image data, converting said bit map data image into fax transmission data, and transmitting said fax transmission data; and (h) terminating fax connection if said selected fax note is completely transmitted.

* * * * *